DASHBOARD SUBASSEMBLY

Filed July 8, 1960 9 Sheets-Sheet 1

INVENTORS
Robert C. Woofter
BY William C. Luscombe

Albert H. Reuther
Their Attorney

March 23, 1965 R. C. WOOFTER ETAL 3,174,576

DASHBOARD SUBASSEMBLY

Filed July 8, 1960 9 Sheets-Sheet 2

INVENTORS
Robert C. Woofter
BY William C. Luscombe

Albert H. Reuther
Their Attorney

March 23, 1965 R. C. WOOFTER ETAL 3,174,576

DASHBOARD SUBASSEMBLY

Filed July 8, 1960 9 Sheets-Sheet 3

INVENTORS
Robert C. Woofter
William C. Luscombe
BY
Albert H. Reuther
Their Attorney

DASHBOARD SUBASSEMBLY

Filed July 8, 1960 9 Sheets-Sheet 4

INVENTORS
Robert C. Woofter
BY William C. Luscombe

Albert H. Reuther
Their Attorney

March 23, 1965 R. C. WOOFTER ETAL 3,174,576

DASHBOARD SUBASSEMBLY

Filed July 8, 1960 9 Sheets-Sheet 5

INVENTORS
Robert C. Woofter
William C. Luscombe

BY Albert H. Reuther
Their Attorney

March 23, 1965 R. C. WOOFTER ET AL 3,174,576

DASHBOARD SUBASSEMBLY

Filed July 8, 1960 9 Sheets-Sheet 6

INVENTORS
Robert C. Woofter
BY William C. Luscombe

Albert H. Reuther
Their Attorney

INVENTORS
Robert C. Woofter
BY William C. Luscombe
Albert H. Reuther
Their Attorney INVENTORS
Robert C. Woofter
BY William C. Luscombe
Albert H. Reuther
Their Attorney INVENTORS
Robert C. Woofter
BY William C. Luscombe
Albert H. Reuther
Their Attorney United States Patent Office 3,174,576
Patented Mar. 23, 1965

3,174,576
DASHBOARD SUBASSEMBLY
Robert C. Woofter, Cortland, and William C. Luscombe, Newton Falls, Ohio, assignors to General Motors Corporation, Detroit, Mich., a corporation of Delaware
Filed July 8, 1960, Ser. No. 41,677
8 Claims. (Cl. 180—90)

This invention relates to vehicle dashboards, and particularly, to subassemblies thereof adapted for establishing electrical connection and mounting for components such as clocks, fuel and temperature gauges, illuminating means and the like for the vehicle.

An object of this invention is to provide a new and improved dashboard structure adapted to receive as a unit, a predetermined subassembly to establish electrical interconnection and mounting between electrical devices and wiring means such as multi-conductor harnesses, printed circuit conductors and the like.

Another object of this invention is to provide a complete pre-connected illuminating cluster as a sub-panel including terminal means, light bulbs and a unitary multi-lamp socket means of integral insulating material having a predetermined shape for proper alignment and mounting on a dashboard directly from wiring means such as a conductor harness and the like on the end of which the cluster is carried as a full subassembly.

Another object of this invention is to provide a pre-connected combination illumination and accessory panel mountable directly on a vehicle dashboard and adapted to include both conductor and terminal means, the latter of which cooperate at least in part with mating clips that provide both electrical connection as well as retention for instruments fitted to one side of the dashboard.

A further object of this invention is to provide a complete instrument panel as a single subassembly functionally as well as esthetically complementary relative to a mounting aperture, predetermined opening and the like of a vehicle dashboard preferably directly on a front side thereof and secured thereto by fastening means such as clips, bolts, dovetail snap fit joints and the like in a single unit with wiring means, illuminating means and instrument means provided only by the single subassembly.

Another object of this invention is to provide a panel subassembly including a body of insulating material having a shape to include integral lamp socket means and terminals therefor preassembled and preconnected to electrical conductor means as well as combination clip and female terminal means having a pair of bowed legs extending generally parallel and adjacent to each other to be complementary with a hook-like end of mating combination retention and electrical male terminal means such that an instrument like a fuel gauge, accessory such as a clock, and the like can be directly secured thereto for retention and establishment of electrical energization, the integral lamp socket means having a predetermined location such that fitting of the instrument, accessory and the like results in alignment with an illumination opening therein with the integral lamp socket means from which illumination is provided directly without any extra lamp means either inside the accessory or instrument or adjacent thereto as a separable part.

Further objects and advantages of the present invention will be apparent from the following description, reference being had to the accompanying drawings wherein preferred embodiments of the present invention are clearly shown.

Figure 5:
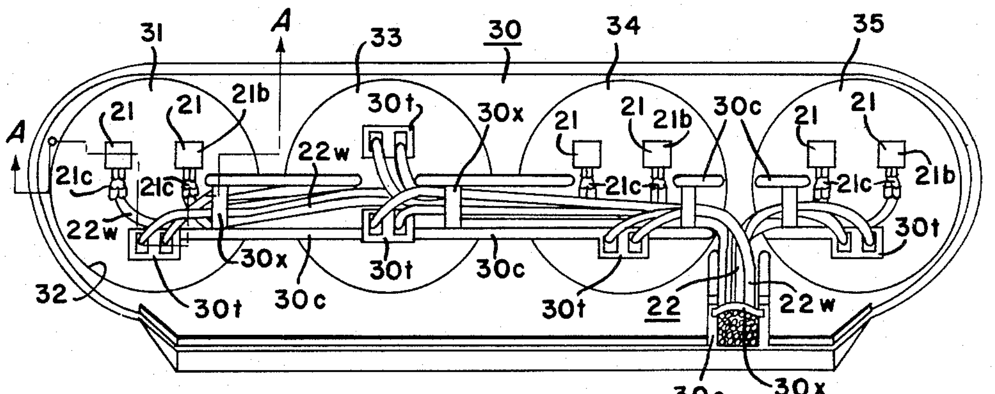
FIGURE 5 is a rear plan view of an instrument mounting dashboard assembly in accordance with the present invention.
Figures 5A, 5B:
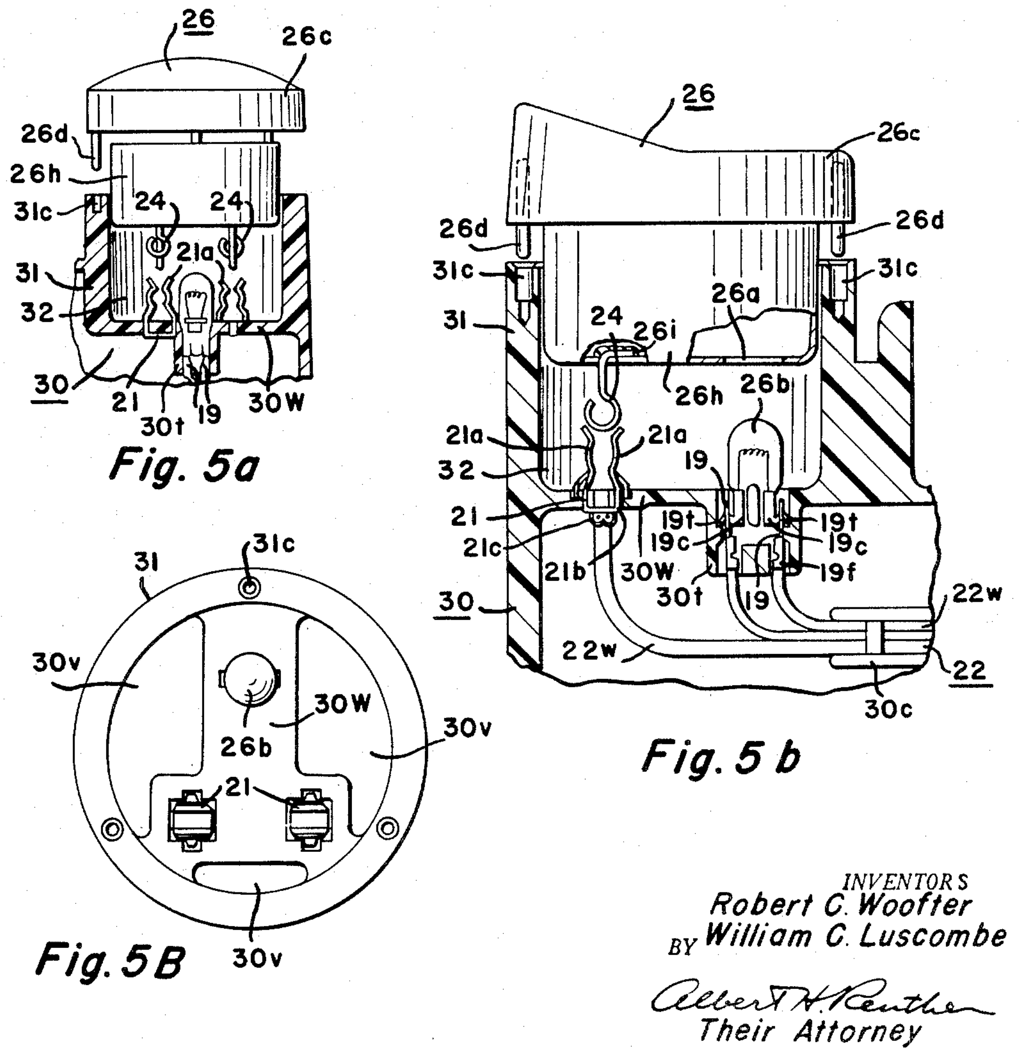

FIGURE 5*a* is a fragmentary cross-sectional view taken along line A—A in FIGURE 5.

FIGURES 5*b*, 5B, 5*c*, 5*d*, 5D, 5*e*, 5E, 5*f*, 5*g*, 5*h*, 5*i*, 5I and 5*j* show modified structures for instrument connection and mounting similar to that of FIGURE 5*a*.

Figures 6, 7:
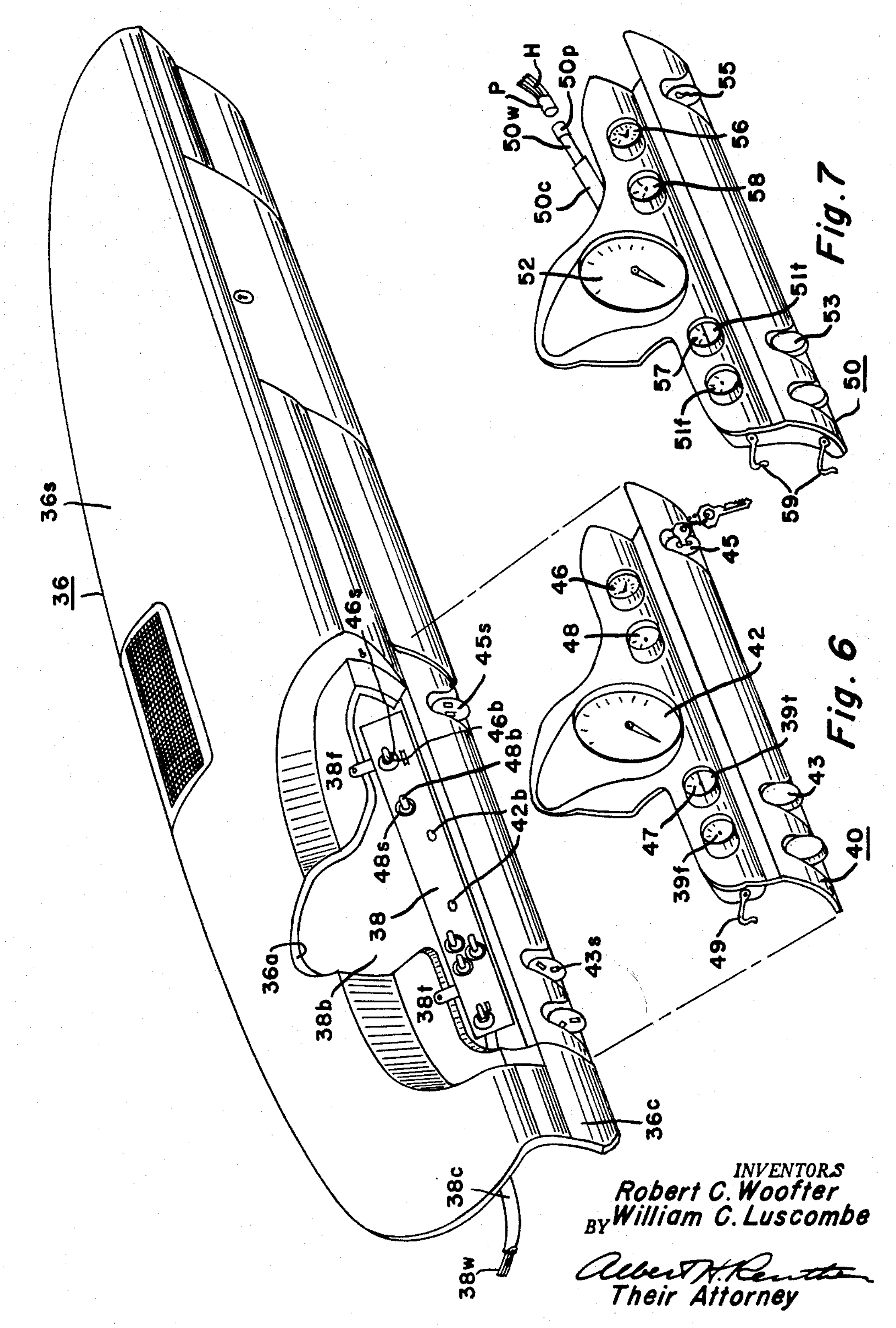

FIGURE 6 is a diagrammatic representation of a complete instrument cluster to fit as a unitary subassembly into a mounting opening of a vehicle dashboard.

FIGURE 7 is a perspective view of a complete wiring means and instrument panel subassembly adapted to fit a dashboard opening in accordance with the present invention.

Figure 8:
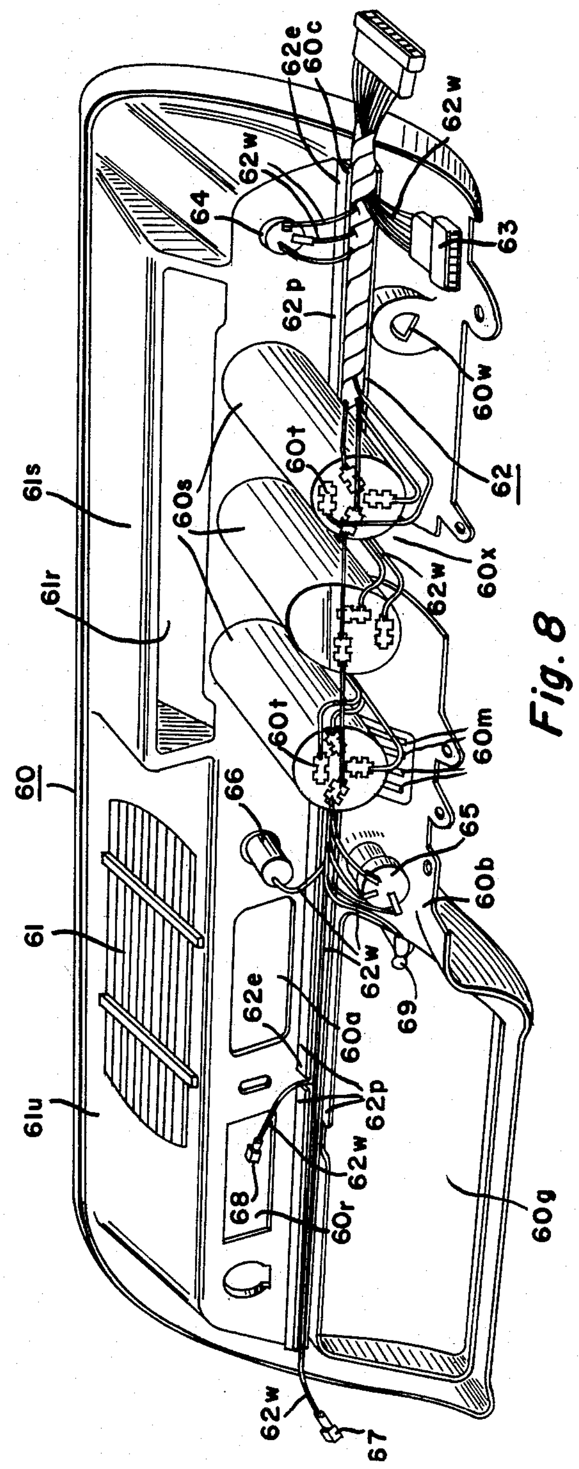

FIGURE 8 is a rear perspective view of a completely preformed console-like dashboard and instrument mounting having electrical conductor means in predetermined positions thereon.

Figures 8A, 9:
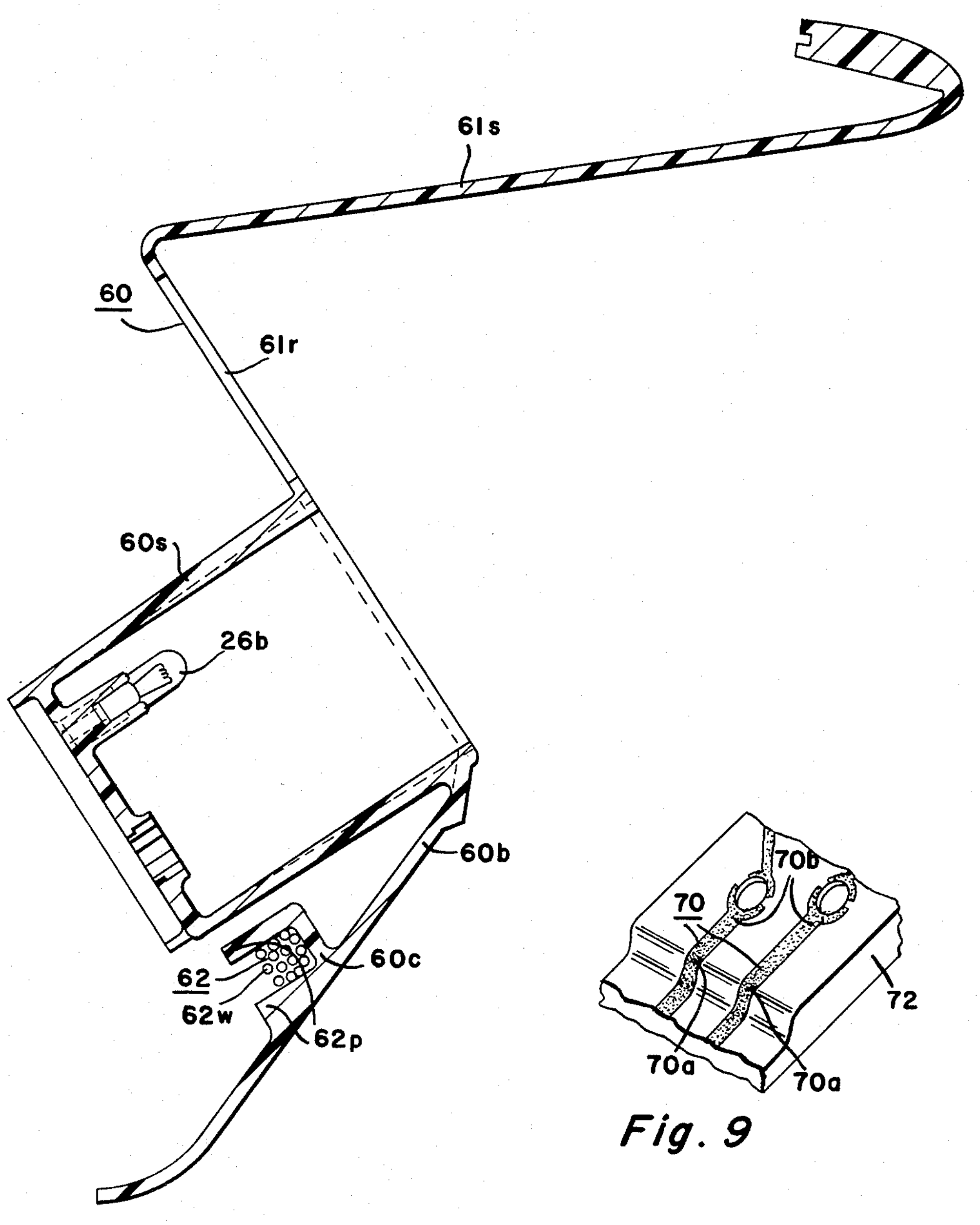

FIGURE 8*a* is a cross-sectional elevational view taken through an end socket mounting of the type shown in FIGURE 8.

FIGURE 9 is a fragmentary perspective view of three-dimensional printed circuitry of electrical conducting material on one side of an instrument mounting socket for a dashboard means.

In recent years, considerable advances have been made so far as streamlining and styling of motor vehicles is concerned. In conjunction with these styling advances, windshields and also dashboards adjacent to passenger compartments of motor vehicles have been contoured and provided with compound curvature designed to improve appearance, safety, as well as usefulness thereof. Quite often however provision of a dashboard having compound curvature results in difficulty in placement of wiring means, connectors, electrical conductors as well as vehicle instruments and accessories relative to the dashboard. In fact, quite often it appears that wiring means underneath a dashboard are so tangled and interwoven that accessibility to a particular instrument such as a fuel gauge or accessory such as a clock and the like is difficult to obtain when servicing or placement thereof becomes necessary. In fact, compound curvature of a dashboard on a motor vehicle often is such that even by having someone crawl onto a vehicle floor board or lie on his back that the instrument and accessories as well as the electrical conductors, wiring means and connectors cannot be reached readily. Space limitations are such that tools or hands will not fit into limited space behind such a curved and contoured dashboard in a location between the dashboard and a vehicle firewall or partitioning panel integral with a floor board for example.

Figure 1:
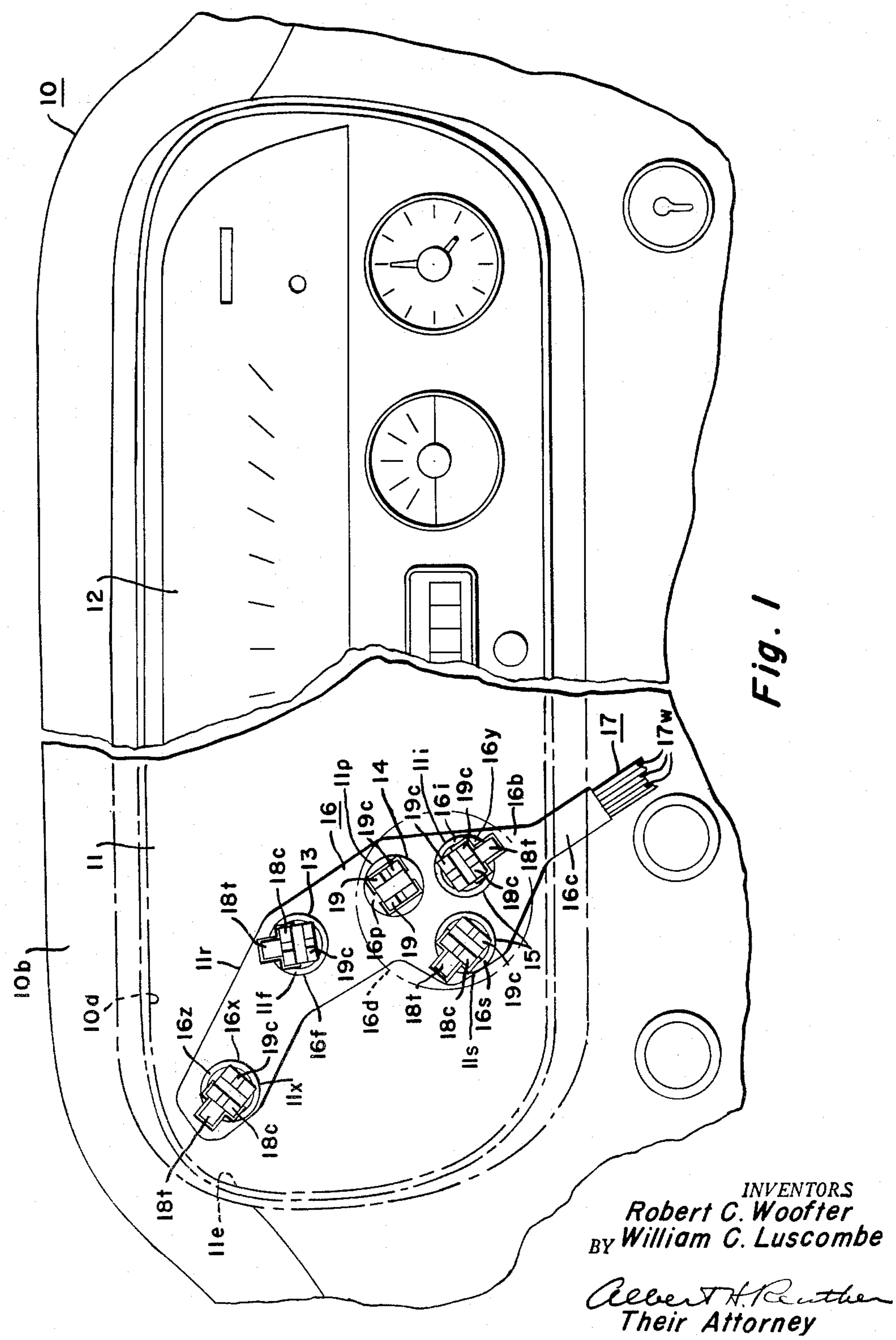
FIGURE 1 is a fragmentary plan view of a pre-connected illuminating cluster as a sub-panel directly carried by wiring means for a vehicle dashboard structure in accordance with the present invention.
Figure 2:
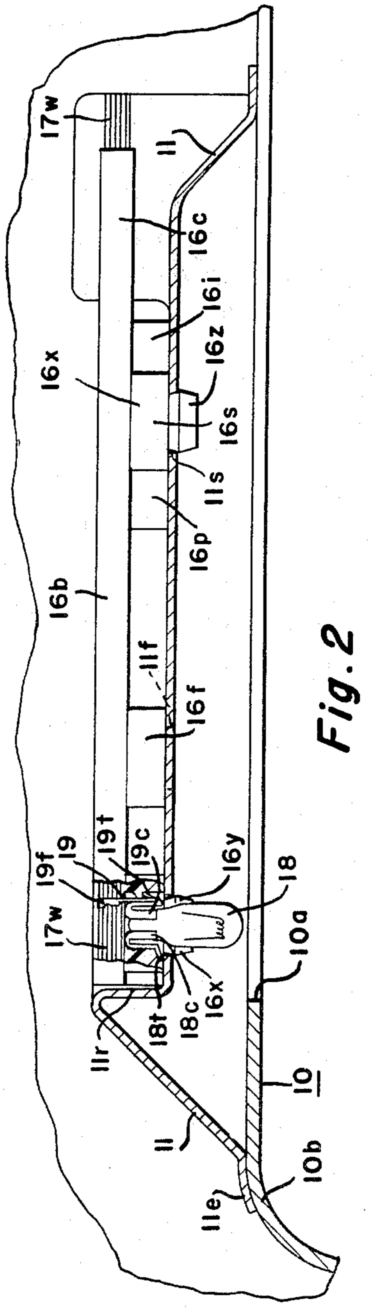
FIGURE 2 is a side view of structure shown in FIGURE 1.

In accordance with the present invention, improvement is made in structure provided as a preconnected subassembly adapted to fit and to be removable with respect to such a curved and contoured dashboard. As a first improvement so far as accessibility of components provided on a dashboard is concerned, FIGURES 1 and 2 illustrate the portion of a curved and contoured dashboard means generally indicated by numeral 10 in the embodiment illustrated in FIGURES 1 and 2, this dashboard means 10 includes a curved body portion made of any suitable material and indicated by numeral **10*b***. A sheet metal stamping forms the body portion 10b that has an opening in which an instrument cluster panel or mounting member 11 is secured by any suitable means such as bolts or welding and the like along edges 11e thereof adjacent to a suitable opening 10a of the body portion 10b. The member 11 is preferably recessed laterally inwardly on a back side thereof having a plurality of lamp openings therein adjacent to instruments to be illuminated. Previously separate wires and lamp sockets had to be inserted individually into these lamp openings and access thereto is often difficult to attain once a vehicle has been assembled at the factory. Among other things, the instrument panel or mounting member houses an illuminatable speedometer means 12, low fuel indicator light means 13, oil pressure warning indicator light means 14 as well as a hot-cold or temperature indicator means 15 and the like. A plurality of individual lamp sockets and bulbs secured to individual wiring means emanating from a harness or grouping of wiring means and conductors can be easily tangled and confused with each other.

In accordance with the present invention, there is provided a pre-connected illuminating cluster as a sub-panel generally indicated by numeral 16 directly carried by wiring means generally indicated by numeral 17. The sub-panel 16 is preferably made in a predetermined shape of moldable plastic material as a body portion 16b including an integral U-shaped extension or channel portion 16c. Integral with the channel portion 16c and body portion 16b, there are a plurality of lamp socket means in predetermined locations and adapted to receive lamp bulb means with respect to terminals therein for energization of the lamp bulb means adapted to be illuminated for various purposes. It is to be noted that the channel portion 16c integral with the insulation body portion 16b projects downwardly or laterally to one side away from the body portion such that a plurality of insulated wires 17w forming a harness can be positioned directly within the U-shaped channel in a neat array and connected directly to various predetermined terminal means of these lamp socket means. As an example, a lamp socket means 16i integral with the body portion 16b of insulating material is located immediately adjacent to the channel portion 16c and is adapted to receive terminal means visible in FIGURES 1 and 2. Further details and description as to these terminal means of two different types will be provided later in this description.

Another integral lamp socket means 16s is located in another portion or position relative to the body portion 16b of insulating material. The lamp socket means 16s is adapted to be located adjacent to the mounting member or panel 11 and is adapted to receive a suitable lamp pulb means also fitted relative to suitable terminal means in the lamp socket portion 16s.

Further lamp socket means 16p of a different type and shape are also provided integral with the body portion 16b of insulating material. For purposes of illustration, the lamp socket means 16p is provided adjacent to a translucent disc suitably carried by the dashboard body portion 10b and marked "oil pressure." It is to be understood that other suitable marking as to function can be provided such as "generator" and the translucent disc 16d as preferably provided with a warning color such as orange, red and the like so as to call attention to illumination of any lamp bulb means connected to terminal means in the socket means 16p. Energization of such a lamp bulb means in any socket such as 16p serves as an indication as to malfunction in an electrical generator of a vehicle wiring circuit. When the lamp bulb means in the socket 16p is electrically connected to be in a circuit energized upon actuation of a fluid pressure switch such as for indicating sufficient lubricating oil pressure on a motor vehicle engine, the disc 16d marked "oil pressure" will be illuminated in the event of malfunction of the oil pressure switch per se or in the event of malfunction or drop in pressure in a lubricating system of a motor or gasoline engine.

Also integral with the body portion 16b of insulating material of sub-panel 16 is a further lamp socket means 16f provided in a location adjacent to one side of speedometer 12. The mounting panel 11 can be provided with a recess 11r having a kidney-like shape complementary to that of sub-panel 16. The sub-panel 16 can include any number of a plurality of various lamp socket means such as 16i, 16s, 16p and 16f all integral with the body portion 16b of insulating material as well as the channel portion 16c. An optional size of the body portion 16b may be such as to include only the four socket means already identified by numerals. However, in some instances, it will be advisable to increase the length of the body portion 16b to include extra socket means such as 16x to provide a mounting and electrical connection for further lamp bulb means for an additional instrument or accessory such as a low fuel indicator light or lighted warning signal at a pre-selected speed. The member 11 is provided with a plurality of openings or aperture 11i, 11s, 11p, and 11x in predetermined locations to receive mounting flanges integral with corresponding lamp socket means described above. However it is unnecessary that each of the lamp socket means should have such mounting flanges and accordingly, at least a pair of the lamp socket means should have such flanges. Thus, in FIGURES 1 and 2, the lamp socket means 16i and 16x are provided with over-center type annular flanges 16y and 16z respectively adapted to be press fitted into engagement with the apertures of periphery of member 11 surrounding these apertures 11i and 11x. These flanges are adapted to be press-fitted into tight engagement with the periphery of each of the apertures in predetermined locations. The body portion 16b of sub-panel 16 including a plurality of integral lamp socket means attached directly to wiring harness 17 can be fitted to the dashboard member 11 and removed therefrom as a unit. Thus wire tangling is avoided and lamp socket means can be easily reached for lamp bulb replacement.

A lamp bulb means 18 shown in FIGURE 2 adapted to fit the various lamp socket means is of a type described in a co-pending application Serial Number 628, filed January 5, 1960, now U.S. Patent 3,017,599, Loesch issued January 16, 1962 and belonging to the assignee of the present invention. The lamp bulb means 18 has a "wedge base" without any metal base portion such that contact wires to energize a lamp bulb filament project beyond a glass bottom and are engageable with a C-shaped terminal portion 19c of terminal means 19 as well as a C-shaped terminal portion 18c integral with a tab 18t electrically engageable with the metal member 11 as a ground connection adjacent to a periphery surrounding the aperture 11i, for example. It is to be understood that the dashboard means can be suitably grounded relative to a vehicle source such as a battery provided with a direct current generator or alternating current generator and suitable rectifying means. The terminal means having the C-shaped portion 18c and tab 18t is substantially like that disclosed in co-pending application, Serial Number 628, filed January 5, 1960, now U.S. Patent 3,017,599, Loesch issued January 16, 1962. The terminal means 19 represents a modification of such terminal structure to include a locking tab 19t adapted to anchor the terminal means 19 relative to a sidewall of the lamp socket means 16i. A ferrule portion 19f integral with the terminal means 19 has at least a pair of side wings adapted to be crimped or swaged into electrical engagement with a wire conductor such as 17w included with a plurality of group conductors with the wiring harness 17. Dissimilar terminal means are also fitted into lamp socket means 16s, 16f and 16x such that a tab portion 18t establishes ground connection relative to a metal member or plate such as bracket 11 of the dashboard means. The C-shaped terminal portion such as 18c and 19c of each of the terminals includes a pair of bowed legs extending substantially parallel and longitudinally relative to each other so as to engage a "wedge base" lamp bulb means such as 18. It is to be noted that the lamp socket means *16p* provides a mounting for a pair of similar terminal means such as 19 wherein both terminals have a conductor or wire such as 17*w* crimped or swaged in electrical engagement therewith and no ground connecting tab portion 18*t* for example is provided. Such a pair of like terminals 19 are used when a lamp bulb is connectable in series with respect to a warning instrument such as a fluid pressure gauge, temperature indicator and the like that is energized and illuminated only upon closing of switch means in series therewith during malfunction of a particular vehicle component. It is to be understood that the entire sub-panel 16 attached directly to an end of the wiring harness 17 can be mounted and demounted with respect to a dashboard means. Any suitable fastening means other than the flanges 16*y* and 16*z* can be provided; for example, fastening clips or through bolts and even clamps can be provided to fit relative to the insulating body 16*b* of the sub-panel 16 with respect to the member 11 of the dashboard means 10. Thus a complete light assembly is provided directly on an end of a wiring means such as the harness 17 and there are a plurality of lamp socket means in predetermined locations and integral with a body portion 16*b* of insulating material relative to the dashboard means. In effect, the sub-panel 16 amounts to a prewired illuminating means for a dashboard of a motor vehicle. Wiring means are pre-fitted to a preformed insulating body including a channel portion such as 16*c* adapted to be mounted in a predetermined location with respect to instruments and accessories on a vehicle dashboard means.

Figure 3:
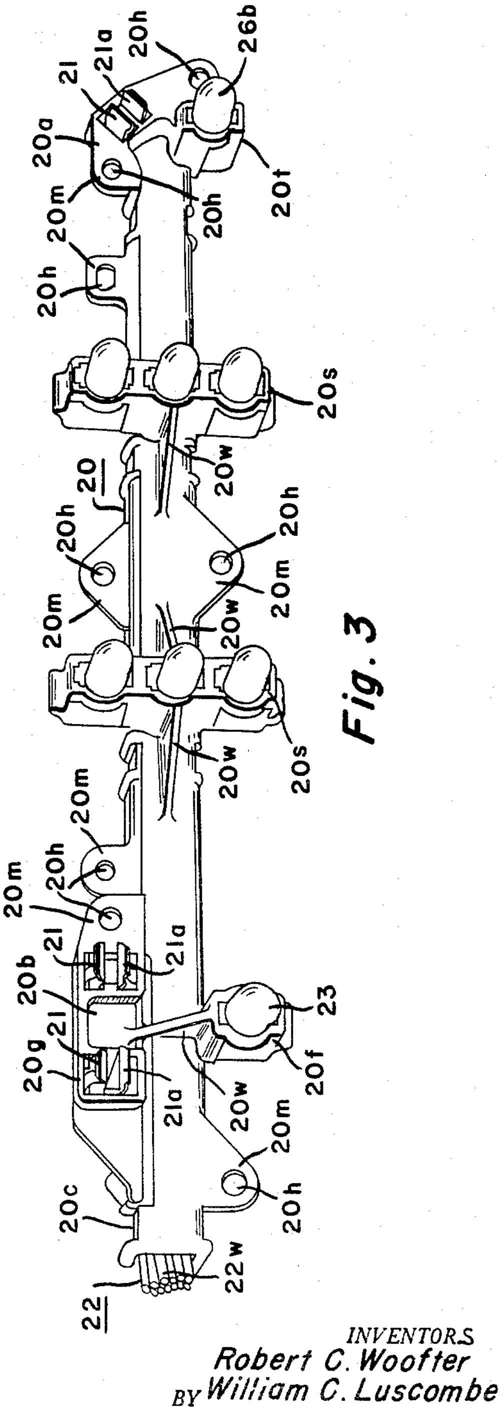
FIGURE 3 is a frontal perspective view of a pre-connected combination illumination and accessory panel mountable as a subassembly directly on a vehicle dashboard and the like in accordance with the present invention.
Figure 4:
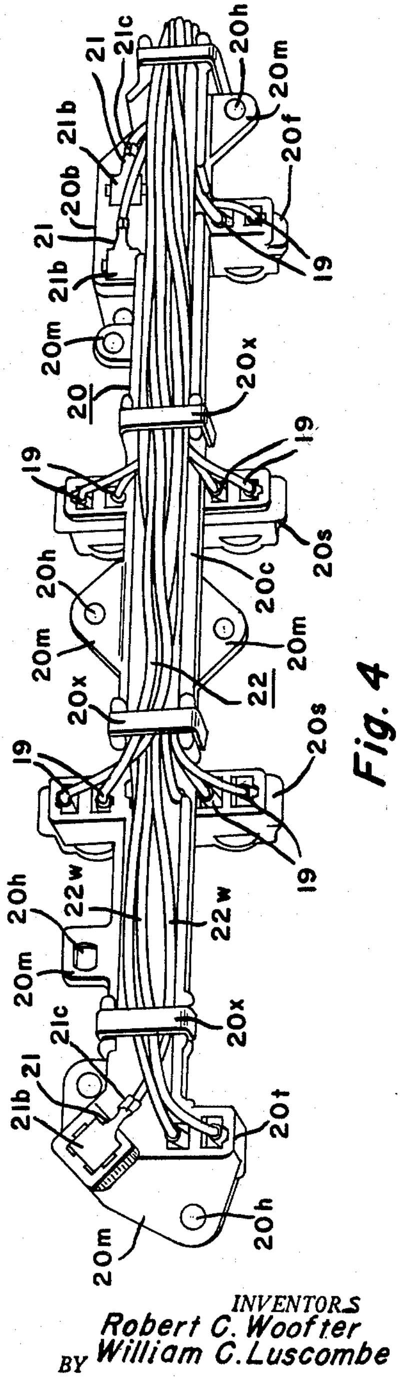
FIGURE 4 is a rearward perspective view of the subassembly of FIGURE 3.

FIGURES 3, 4, and 5 illustrate a pre-connected combination illumination and accessory panel means mountable as a sub-assembly directly on a vehicle dashboard and the like in accordance with the present invention. In FIGURES 3 and 4 there is a sub-assembly generally indicated by numeral 20 having a body portion 20*b* of insulating material integral with a channel portion 20*c* joined to both lamp socket means as well as combination mounting clip and terminal means socket portions indicated by a numeral 20*g*. The socket portion 20*g* receives a combination clip and terminal means 21 located in pairs a predetermined dsitance from each other and adapted to establish a mounting and electrical connection for an accessory or instrument means such as a gauge to indicate fuel stored in a tank. The combination clip and terminal means 21 have a pair of bowed legs or arm 21*a* as visible in a side view thereof in Figure 5*a*. These legs or arms 21*a* form a substantially C-shaped portion integral with a body portion 21*b* that is further integral with a ferrule or crimp portion 21*c* visible in FIGURES 4 and 5 and including at least one pair of wings adapted to be swaged or crimped into electrical engagement with a wire or insulated conductor 22*w* grouped as a wiring means or harness generally indicated by numeral 22. A similar combination clip and terminal means 21 is provided alone in a socket or accessory mounting portion 20*a* also integral with the body portion 20*b* and channel 20*c* of insulating material. A lamp socket means 20*f* having terminals such as 19 therein visible in FIGURES 4 and 5*b* and noted also in description with respect to FIGURES 1 and 2 can be provided to establish electrical connection with respect to a "wedge base" lamp bulb means 23. This lamp bulb means 23 is adapted to provide illumination for a gauge such as to inidicate fuel content, the gauge having a pair of contact clips with hook-like end adapted to be complementary and to be wedged in between the pair of bowed arms 21*a* of the combination clip and terminal means 21. An example of such a hooked end terminal means 24 is provided in FIGURE 5*b*. Also in FIGURE 5*b* there is shown a side view of an instrument or an accessory such as a clock 26 having a housing 26*h* provided with an insulating portion 26*i* relative to which the clip terminal means 24 is mounted. The housing 26*h* has an opening or aperture 26*a* therein through which a bulb 26*b* of a type noted above can project to provide illumination through a suitable conduit with respect to a face of the clock. Depending upon the clock structure which forms no part of the present invention, the face of the clock can be translucent so as to be subject to rear lighting or other suitable lens structure can be provided in the clock housing for suitable diffusion of light relative thereto. The body portion 20*b* illustrated in FIGURES 3 and 4 also includes integral mounting extension 20*m* in predetermined locations and adapted to be in alignment with corresponding mounting brackets or dashboard means against which the body portion 20*b* can be fastened by suitable clips or bolts which can fit through holes 20*h* provided in these mounting flanges 20*m*. A plurality of webs 20*w* are integral with the body portion 20*b* and channel portion 20*c* of subassembly 20 so as to strengthen the same with respect to each other and also with respect to the lamp socket means such as 20*f* and a pair of additional lamp socket means 20*s* provided in spaced relation and substantially parallel to each other as best seen in FIGURE 3. These plural banks of lamp socket means 20*s* in pairs are adapted to provide illumination or back lighting for an instrument such as a speedometer mounted relative to a dashboard. It is apparent that the subassembly 20 of FIGURES 3 and 4 includes not only illuminating means but also includes combination clip and female terminal means 21 for mounting and electrical engagement relative to an accessory or instrument. The subassembly 20 can be mounted and demounted with respect to a dashboard means on a motor vehicle with respect to the mounting flanges 20*m* and confusion as well as tangling of wiring is avoided due to direct connection of the subassembly 20 to an end of the wiring harness or wiring means 22. The body portion 20*b* including the integral channel 20*c* as well as the lamp bulb sockets 20*f*, 20*s* and the like together with the gauge mounting socket 20*g* or accessory socket 20*a* can be fastened or bolted as one longitudinally extending member in a location on one side adjacent to any panel such as a dashboard means.

FIGURE 5 represents a subassembly generally indicated by numeral 30 similar to that indicated by numeral 20 in FIGURES 3 and 4 except that an accessory socket or panel mounting portion 31 is formed integrally therewith to provide angular or rectangular space 32 into which the housing 26*h* of the accessory such as a clock can be fitted. Integral with the subassembly 30 there is a channel portion 30*c* into which conductors or insulated wires such as 22*w* of a wiring means or harness 22 can be fitted. Conductors or insulated wires 22*w* are secured to terminal means such as 19 or to combination clip annd female terminal means 21 as noted earlier. The combination clip and female terminal means 21 are described further in a copending application Serial No. 741,599, filed June 12, 1958, now Patent 2,955,178, Lander et al., issued October 4, 1960, and belonging to the assignee of the present invention. It is further to be understood that the conductors or insulated wires 22 grouped as wiring means or harness structure 22 can be retained relative to the channels 20*c* or 30*c* by clamp-like members visible partially in views of FIGURES 4 and 5 and represented by numerals 20*x* in FIGURE 4 and 30*x* in FIGURE 5. These clamp-like members are generally C-shaped including a pair of hook-ended arms as further described in a co-pending application, Serial No. 842,335, filed September 25, 1959, now U.S. Patent 3,055,971, Lander, issued September 25, 1962, and belonging to the assignee of the present invention. Integral socket means 20*t* and 30*t* are shown in FIG- URES 3 and 5 for receiving the lamp bulb means *26b* used for illuminating an accessory such as the clock 26 indicated in FIGURE *5b*. The socket means *30t* is integral with a wall or partition *30w* located to one side of the space 32 and adapted to receive terminal means 19 as well as the combination clip and female terminal means 21. The accessory means or clock 26 can be provided with a separable cover portion *26c* having pins or dowels *26d* adapted to dovetail into cavities *31c* for maintaining proper alignment of the accessory relative to the sub-assembly 30. The sub-assembly 30 made of insulating material such as sisal-filled polyester, plastics and the like can be secured to a curved or contoured dashboard means or panel by any suitable clips, fastening means, bolts and the like. Delrin or polyacetal resin as well as other insulating materials finished to have a metallized surface can be used. FIGURE *5a* represents a cross section of structure including terminal means provided for accessory or instrument mounting socket portion. In addition to the clock-mounting portion 31 there can be provided a socket portion 33 having a pair of lamp mountings such as *30t*, each lamp therein serving as a warning light such as for electrical generator functioning and oil pressure gauging. Another socket portion 34 can provide combination terminal and clip means as well as suitable lamp connector terminal means for a temperature gauge or indicator including hot as well as cold warning lights or at least a high temperature warning light means. A fourth socket portion 35 can also be fitted with combination clip and terminal means for connection and retention of a fuel gauge to be illuminated by a lamp bulb means fitted to terminal means such as 19 noted earlier.

Figures 5C, 5D, 5E:
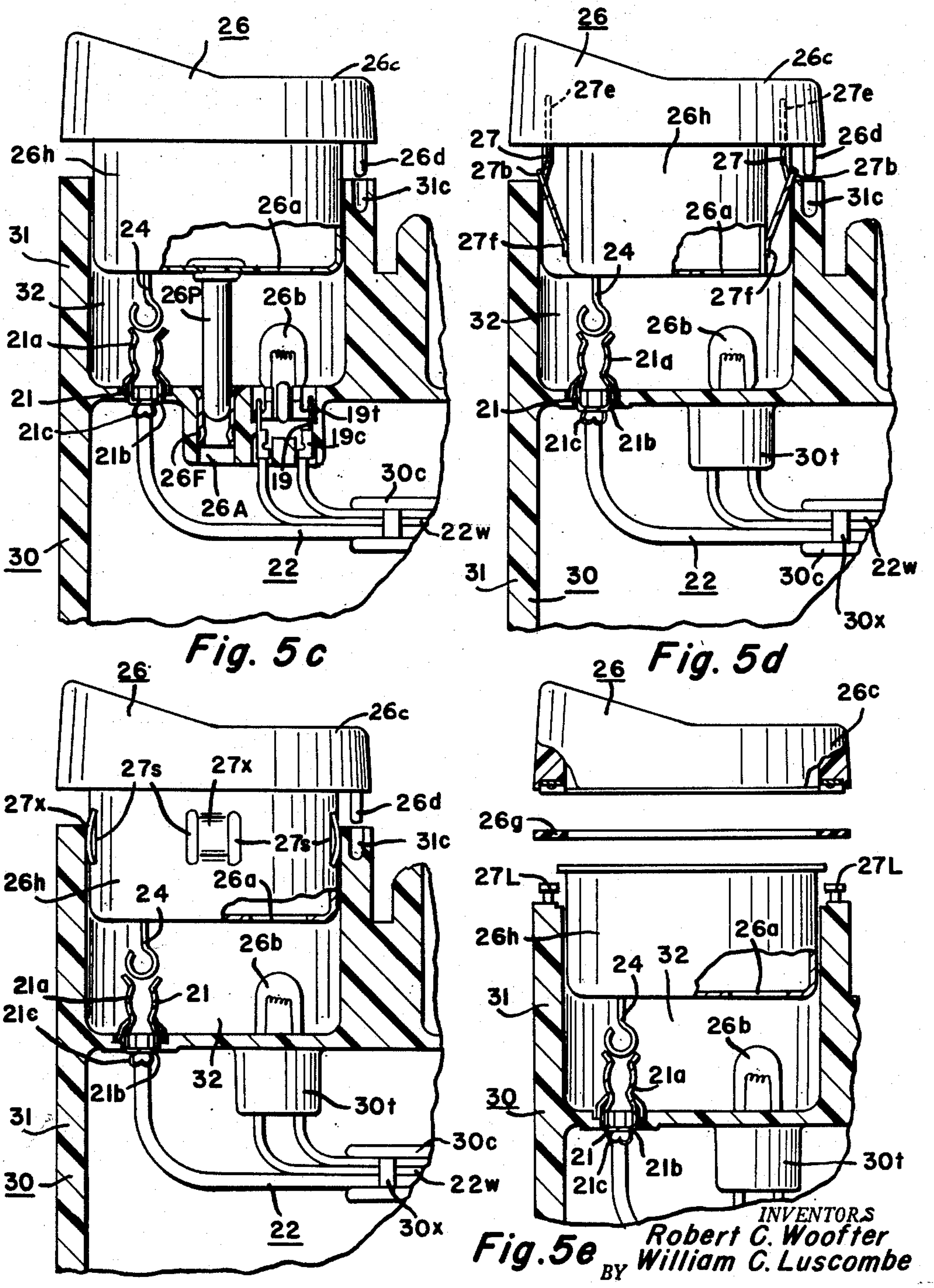
Figures 5E, 5F, 5G, 5H:
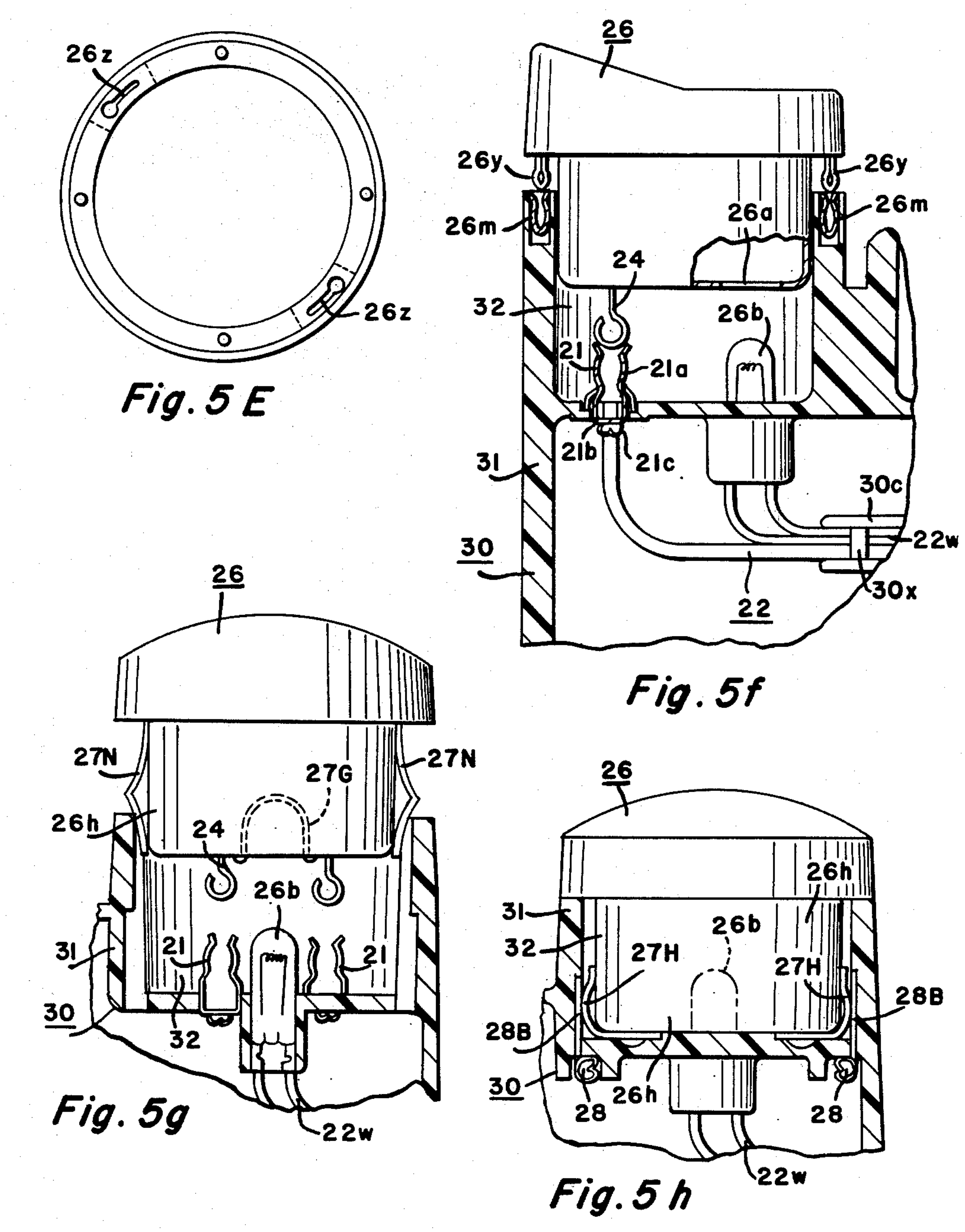
Figure 5I:
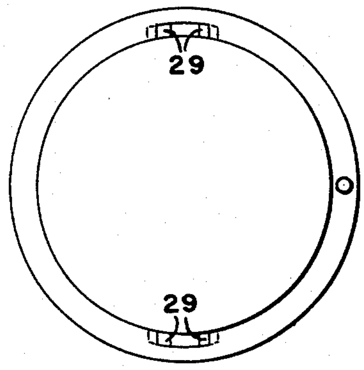
Figure 5J:
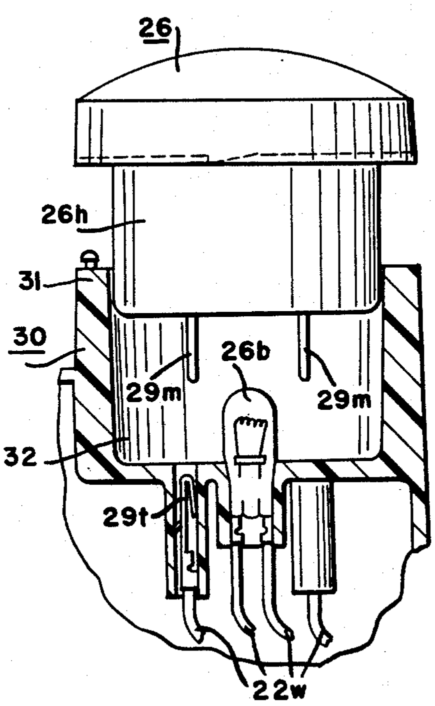
Figure 5I:
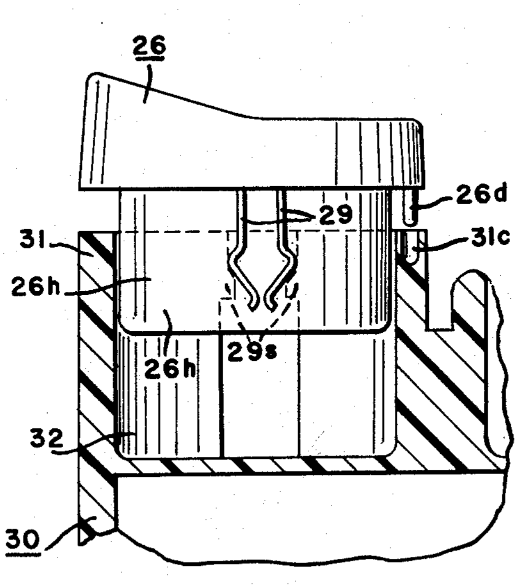

FIGURES *5b* and 5B represent modifications in socket portion structure including mainly provision of a channel section *30c* not directly on an end wall portion where combination clip and terminal means as well as lamp bulbs are mounted but rather having open areas or ventilating passages *30v* located laterally adjacent to a bridge-like or T-shaped wall portion 30W visible best in the view of FIGURE *5b*. Multiple dowels or pins *26d* are shown in FIGURES *5b* and 5B. In FIGURE *5c* there is provided a single pin 26P projecting from the center of a housing such as *26h* for polarized fit of an accessory or instrument having only one dowel *26d* as a locating pin. Single pin 26P fits a metal-lined aperture 26A having a retention means such as a flange portion 26F engageable by an outer periphery of pin 26P. FIGURE *5d* shows a modified accessory or instrument housing whereon at least a pair of spring clips 27 are provided. These clips have one end *27e* embedded or anchored in a suitable part such as cover *26c* of the accessory or instrument. An opposite free end *27f* of each clip abuts against housing *26h*. Each clip 27 has a central barb *27b* to project laterally outwardly for frictionally engaging an inner peripheral surface of any one of the socket portions. FIGURE 5D has bridge portions *27x* formed by a pair of parallel slots *27s* in the housing such as *26h*. A laterally outwardly bent central part of each bridge *27x* engages an inner peripheral portion of a socket portion of insulating material so as to center the accessory or instrument relative to space 32.

FIGURES *5e* and 5E illustrate another instrument mounting wherein housing *26h* is separable from the cover portion such as *26c* and a gasket *26g* of elastomeric material is provided as a peripheral seal against dust, moisture and the like. FIGURE 5E provides a plan view of key-hole slots *26z* in the cover portion or bezel adapted to have a bayonet-like fastening or twist lock with respect to a pair of lugs 27L located diagonally apart from each other.

FIGURE *5f* illustrates provision of spring plugs *26y* on the cover portion to mate with metal sleeves or sockets *26m*. FIGURE *5g* shows an instrument housing with a glass lens 27G therein as well as a pair of spring clips 27N each having a central barb or bite portion frictionally to engage a socket periphery. FIGURE *5h* shows combination grounding and retainer clip means 27H on housing *26h* adapted to engage blade portions 28B of terminals 28. One of the clip means 27H can be insulated with respect to housing 26. FIGURES *5i* and 5I illustrate two arm clips 29 mounted on opposite sides of housing *26h* and adapted to lock or latch into engagement with shoulders *29s* outlined in FIGURE *5i*. FIGURE *5j* shows male blade terminal means *29m* projecting from housing 26 and adapted frictionally and electrically to engage female terminals *29t* which are of a type disclosed in Patent 2,682,038, Johnson. Mating terminal means establish both electrical connection as well as a frictional engagement for retention and holding of the accessory or clock such as 26 relative to a dashboard means or mounting panel. Provision for both electrical connection and retention of instrumentation on a panel makes possible installation and removal of an accessory or instrument directly from a front side of a dashboard means for example. Servicing of such instruments and accessories is facilitated because these components can be removed from mounting and electrical engagement simultaneously either manually or by use of suitable tools.

FIGURES 6 and 7 illustrate further improvements in accordance with the present invention whereby a complete instrument panel as a single sub-assembly functionally as well as esthetically can be mounted complementary to a predetermined mounting aperture or opening and the like of a vehicle dashboard. Dashboard means generally indicated by numeral 36 in FIGURE 6 can include a shelf portion *36s* integral with a curved or contoured portion *36c* adapted to fit relative to a vehicle body adjacent to a windshield and the like. Fastened to a back side of the dashboard means 36 there is shown a sub-assembly 38 similar to that represented by numerals 20 and 30 in FIGURES 3 and 5. The sub-assembly 38 includes a conduit portion *38c* integral with an insulating body portion *38b* relative to which wiring means *38w* is fitted and connected relative to lamp socket means *38t* including suitable combination clip and terminal means engageable for mounting and electrical energization of a gauge such as a temperature indicator *39t* of an instrumentation panel means generally indicated by numeral 40 in a partially exploded view of FIGURE 6. The sub-assembly 38 further includes an integral socket means *38f* adapted to receive combination mounting clip and terminal means engageable for retention and electrical energization of a gauge such as a fuel indicator *39f* mounted integrally with the instrumentation panel means 40. The instrumentation panel means 40 has a predetermined shape generally complementary and supplemental to an opening or aperture *36a* or a dashboard means 36.

Also mounted integrally with the instrumentation panel 40, there is a speedometer 42 having a suitable coupling engageable with a transmission connected cable and the like in a well-known manner. The sub-assembly 38 is provided with integral lamp socket means and lamp bulbs *42b* can be mounted thereto to be in predetermined locations for illumination of the speedometer 42 provided as part of the instrumentation panel 40. A suitable light switch means 43 can also be mounted to form part of the instrumentation panel 40 and adapted to be electrically engageable with a socket portion *43s* of the sub-assembly 38 relative to which a lamp bulb socket means can also be provided for retention of electrical terminal means to establish connection with respect to the switching means 43. An ignition switch 45 is also shown mounted together with the instrumentation panel 40 as a whole and engageable relative to suitable socket means *45s* to establish electrical connection thereto. Suitable illuminating means such as a lamp bulb can be provided in the sub-assembly 38 and having structure similar to that shown in FIGURES 1 and 2 and including terminal means engageable by a "wedge base" lamp bulb means and the like. An accessory such as a clock means 46 is also clustered as part of the instrumentation panel means 40 and is engageable relative to a socket portion 46*s* provided integrally with the subassembly 38. Combination clip-terminal means such as 21 shown in FIGURE 5 can be provided for retention and electrical energization of the clock means or accessory 46. An oil pressure indicator 47 as well as a generator indicator 48 also form part of the instrumentation panel 40 adapted to be plugged into socket means 48*s* and 46*s* provided therefor respectively by the sub-assembly 38 attached to the dashboard means 36. A lamp bulb means 46*b* can be fitted to the terminals in the socket 46*s* and a lamp bulb means 48*b* can be provided in electrical engagement with the terminals of a socket 48*s* for use in conjunction with the indicator disc of the generator warning means 48. It is readily apparent all instrumentation and accessory means are mountable and demountable with respect to the sub-assembly 38 due to grouping of the instrument and accessory means with respect to the instrumentation panel 40. The panel 40 can be provided with suitable fastening means 49 such as clips, clamps and the like and adapted to snap into engagement with a peripheral edge of the opening or aperture 36*a* of the dashboard means 36. One or more of these fastening means 49 can be provided for mounting of the instrumentation panel 40 as a unitary cluster relative to the dashboard means 36.

FIGURE 7 illustrates instrumentation panel means generally indicated by numeral 50 and having a temperature gauge or indicator 51*t* as well as a fuel gauge or indicator 51*f* provided as part there together with a speedometer means 52, a light switch means 53 ignition switch 55 and also an accessory such as a clock means 56 as well as an oil pressure indicator 57 and generator warning light or indicator 58. Multiple fastening means 59 in the form of clips, clamps, and the like are provided for mounting the instrumentation panel means 50 relative to an opening or aperture such as 36*a* of the dashboard means 36. The structure of FIG. 7 so far as the panel means 50 is concerned differs from that of FIGURE 6 in that a channel means 50*c* is formed integrally with the panel means 50 rather than separately with sub-assembly 38 as indicated in FIGURE 5. Also, the terminal and socket means for the various instruments and accessories are located integrally with the panel means 50 generally such that wiring means 50*w* including a group of bundled conductors to establish electrical connection with respect to particular instruments and accessories as well as lamp bulbs for illumination thereof passes directly through the channel 50*c*. The wiring means 50 have a plug means 50*p* secured thereto and adapted to be mated with a plug P of a wiring means for harness H forming part of a vehicle wiring system connectible with a suitable source of energization. It is to be understood that the panel structure 50 of FIGURE 7 can be removed from the dashboard means such as 36 as a complete assembly connectible to a common power source by way of a single plug outlet or connector means identified by references 50*p* and P in FIGURE 7. The entire instrument panel means 50 can be mounted and fitted to a dashboard means such as 36 as a single unit including wiring, light bulb means, instruments, accessories and the like. This entire instrumentation panel 50 fits as a unitary sub-assembly directly relative to the forward side or outer surface of the dashboard means 36. Fastening means such as bolts, clips and the like can be used to secure the instrumentation panel means 50 as a unitary cluster directly to the dashboard means 36. It is to be understood that inside the passenger compartment of a motor vehicle the cluster of instruments as included by panel means 50 will add to the decorative appearance of the dashboard means and will also require a minimum of space below the dashboard means. The instrumentation panel 50 as well as the panel means 40 can be made of a moldable plastic material to support instruments and accessories. Use of such plastic material will provide insulation as well as protection against vibration and also integral socket means for mounting of electrical terminal means and connectors adapted to be locked in predetermined position relative to the panel means as well as the dashboard means. Locking of these socket means and terminals relative to the dashboard means is of course indirect due to primary engagement of the instrumentation panel means by fasteners such as clips 49 and 59 and the like. Wiring means can be placed and retained in preformed channel portions integral with insulating bodies to form a complete sub-assembly. It is to be understood that the wiring means can be retained in position by potting materials such as epoxy resin as well as clips or plastic foam bondable with the body portions of insulating materials of the sub-assemblies. The instrumentation panel means 50 form a combination prewired instrument panel mountable relative to a dashboard means and adapted for quick connection relative to connector means with respect to a wiring harness.

It is to be understood that the shelf portion 36*s* as well as the curved or contoured portion 36*c* of the dashboard means 36 in FIGURE 6 can be provided with a suitable crash pad of elastimeric foam material. Polyurethane foam material can also be used for formation of this crash pad covering on the shelf 36*s* and the curved or contoured portion 36*c*. Suitable covering sheets of plastic material with a simulated leather surface and the like can be provided over the foam crash pad material.

In FIGURE 8, there is shown a completely preformed console-like dashboard and instrument mounting having electrical conductor means in predetermined positions thereon. This console-like dashboard is generally indicated by numeral 60 and includes a complete preformed body portion 60*b* having an opening 60*g* for a glove compartment and the like as well as socket portions 60*s* integral therewith. FIGURE 8*a* represents a cross-sectional elevational view through one of these socket portions into each of which an instrument or accessory is adapted to fit for mounting and retention therein. In accordance with the present invention, the body portion 60*b* has integral conduit or channel means 60*c* formed on one side thereof and extending laterally in substantially end-to-end relation thereto. The body and socket portions as preformed can be made as a die casting appropriately finished and decorated on a passenger compartment side thereof. The body and socket portions can also be molded of suitable insulating material such as plastic, resin mixtures, fiberglass and the like. A speaker grill 61 can be provided integrally with an upper flange or panel projection 61*u* of the body portion 60*b*. A speedometer mounting portion 61*s* is provided to form an opening or recess 61*r* above socket portions 60*s* adjacent to which a suitable speedometer means is adapted to fit. An aperture or opening 60*r* is located in body portion 60*b* above the glove compartment opening 60*g* and is adapted to permit mounting for a radio and the like. Another suitable aperture 60*a* is provided for an ash tray or receptacle. A wiring harness means generally indicated by numeral 62 fits complementary to the conduit or channel portion 60*c* as shown in the drawings. A windshield wiper control mounting aperture 60*w* is located adjacent to one end of the body portion 60*b*. Heater, defroster and fresh air control means mounting apertures 60*m* are located laterally to one side of a steering column cut-out 60*x*.

The wiring harness 62 includes a plurality of grouped and insulated conductors or wires 62*w* which are fitted and retained in the conduit or channel portion 60*c*. U-shaped clamps similar to those visible in FIGURES 3, 4, and 5 can be used to hold these conductors or wires in place in the conduits or channels. The conductors or wires supply energization for predetermined instruments or accessories and are adapted to pass through exit openings 62e left in sides of the conduits or channels due to predetermined spacing and interruptions in substantially parallel wall portions 62p molded integrally with the dashboard body portion to provide the conduits or channels on one side thereof. Appropriate wires 62w depart from the harness in the conduit or channel to a headlight switching means 63 located below an indicator mounting such as for a brake warning light, direction signal lamps, speed warning device and other electrically powered accessory means identified by reference numeral 64. Certain conductors or wires have terminal means directly attached to ends thereof and these means are indicated by numerals 60t in two locations corresponding to similar structure for similar purposes identified previously by numerals 19 and 21, respectively. Further harness wires pass from conduit or channel 60c to ignition switch means 65 and a cigarette lighter or other indicating accessory such as indicated by numeral 66. An electrical connector 67 projects from an end of the conduit or channel 60c and can be used for energization of a courtesy light that provides illumination for a passenger compartment upon opening of a door. Another connector 68 can be used to establish energization of radio means or components thereof fitted to the opening 60r while a light socket 69 is fitted onto a suitable flange adjacent to the glove compartment opening 60g. This light socket 69 is also connected to a wire or conductor from the single harness 62 in the lone conduit or channel means integrally formed with the body portion 60b of the console-like dashboard means in accordance with the present invention.

In each of the embodiments described thus far, it is emphasized that a wiring harness is provided to be shipped completely preassembled for a customer to mount in a predetermined way. The integral illumination panel of FIGURES 1 and 2 eliminates need for individual lamp sockets for automotive use, particularly in the instrument cluster area. Its primary purpose is to make possible installation of a number of illuminating and tell-tale lamp sockets in one operation. Previously, it has been necessary to perform separate operations to install each socket and now there results a saving in labor and time as well as an avoidance of a confusing clutter of tangled wiring known behind a dashboard. FIGURES 1, 2, 3 and 4 illustrate panel assemblies having a plastic body portion with integral channel means and multiple integral socket portions into which a desired number of lamp terminals, combination clip and terminal means, and ground contacts can be fitted. There is only a one piece plastic molding as noted also for FIGURES 5 and 8 containing a desired number of socket cavities, panel mounting devices and a channeling system to protect the cable or conductors and to allow the panel to be taped or held by clamps to the harness. As for the assemblies of FIGURES 1, 3, and 5, the plastic body portions thereof are adapted to be snapped into mounting engagement on one side of a dashboard in one operation.

Another advance in vehicle dashboard electrical connections can be identified as a three-dimensional printed circuit generally indicated by numeral 70 on molded body portion 72 of insulating material shown in FIGURE 9. Conceivable an entire dashboard can be vacuum formed to a predetermined shape after coating or plating of conducting material thereon as a printed circuit in effect to go around corners or curves. Also, it is possible to have a depth dimension of printed circuit conducting material extend longitudinally and laterally relative to body portion 72 by having a portion 70a thereof in a plane other than that of a portion 70b as shown in FIGURE 9. Each of the printed circuit strips can terminate adjacent to a mounting aperture for a lamp socket means, connector and the like having terminals therein for electric connection relative to an illuminating component and the like.

A suitable recess can be molded into the body portion 72 for mounting a plug-in speedometer and other instruments or accessories. It is to be understood that the body portion 72 can be built up as a laminate wherein a printed circuit pattern is "stamped on" one side of a thin flexible sheet of insulating material which can be pliable to conform and be bonded to shape of a dashboard body portion. Polyester resins, acetal resins such as "Delrin" as well as polyannide materials "Nylon," "Profax," "Cycolac" and "Lucite" and other plastics can be used as the insulating material for the body portion. A good conducting surface can be obtained by using a silver-loaded conducting paint which adheres to plastic or fiberglass insulating material even if formed into a bowl shape or three dimensional socket portion for instrument mounting.

While the embodiments of the present invention as herein disclosed constitute preferred forms, it is to be understood that other forms might be adopted.

What is claimed is as follows:

1. For a vehicle having electrical wiring means such as insulated conductors, grouped wires as a harness and the like as well as a dashboard means to carry instrumentation, accessories and the like, an illuminating-cluster subassembly per se, comprising, a body portion of moldable insulating material having a predetermined configuration adapted to fit to one side of the dashboard means though definitely separable therefrom, a channel portion recessed to complement and receive the wiring means and extending integrally to one side of said body portion to be removable simultaneously therewith, a plurality of lamp socket means also completely integral with rather than separable from said body portion of insulating material combined with each other and having predetermined positioning of said plurality of lamp socket means directly established integrally entirely only by said body portion, conducting terminal means provided in each of said lamp socket means for mounting and interconnection between energizable illuminators such as light-bulbs and termination from the wiring means directly on said body portion always together as accessible both after and prior to attachment of said body portion to the dashboard means of the vehicle, and fastening means also of insulating material that projects integrally from said combined lamp socket means and body portion to maintain attachment of said body portion as a pre-wired plural-lamp unit separable for light bulb servicing of any and all said lamp socket means in common therewith directly on one side of the dashboard means laterally thereof.

2. The subassembly of claim 1 wherein all said plurality of lamp socket means extend transversely relative to said body portion as entirely integral therewith, and at least one pair of said integral lamp socket means having flange means integral axially therewith to form said fastening means engageable with peripheral edging of predetermined illuminator openings in the dashboard means.

3. For a vehicle having electrical wiring means such as insulated conductors, grouped wires as a harness and the like as well as a dashboard means to carry instrumentation such as fuel and temperature gauges, ignition switch means, generator and oil pressure warning indicators, speedometer means as well as accessories such as clocks, lighters and the like, an illuminating cluster subassembly per se, comprising, a body portion of moldable insulating material having a predetermined configuration adapted to fit on one side of the dashboard means and separable therefrom as a plural-lamp unit, a channel portion recessed to complement and receive the wiring means extending integrally and directly on one side of said body portion to be removable simultaneously therewith, a plurality of lamp socket means all entirely integrally carried by said body portion and including at least one each alignable for illuminating the instrumentation as well as the accessories in a predetermined location on the dashboard means according to predetermined socket means positioning simultaneously determined only as all combined with each other to be integral with said body portion of insulating material, conducting terminal means provided in each of said lamp socket means for pre-mounting and electrical interconnection between energizable illuminators such as light bulbs and termination from the wiring means directly on said body portion prior to attachment of said body portion to the dashboard means, and fastening means also of insulating material that projects integrally from said combined lamp socket means and body portion to maintain attachment simultaneously for said combined lamp socket means and body portion as a pre-wired plural-lamp unit separable for light bulb servicing of any and all said lamp socket means in common therewith as fitted with lamp bulbs prior to installation directly on one side of the dashboard means to be readily accessible for removal and replacement of the light bulbs by disassembly of said body portion of moldable insulating material therefrom.

4. The subassembly per se of claim 3 wherein conducting terminal means for lamp socket means of said body portion of moldable insulating material are alike in predetermined pairs for connection with illuminators of generator and oil pressure warning indicators and the like whereas terminal means for remaining instrumentation and accessories illumination are definitely dissimilar in pairs in predetermined locations adjacent thereto after attachment of said combined lamp socket means and body portion by said integral fastening means relative to the dashboard means.

5. In combination, a dashboard means of a vehicle having electrical wiring means as well as instrumentation grouped with accessories collectively including fuel indicator means, temperature means, ignition switch means, generator-warning-indicator means, lubrication pressure-warning-indicator means, speedometer means as well as accessories such as clocks, lighters and the like, and an illuminating-cluster subassembly pre-wired per se collectively and directly to one end of the electrical wiring means so as to avoid confusion and tangling of the wiring means behind the dashboard means accessibility to which is improved and comprising, a body portion of moldable insulating material having a predetermined configuration adapted to complement alignment of instrumentation and accessories as fitted to the dashboard means, a channel-like guide portion recessed to complement as well as receive the wiring means and located integrally on one side of said body portion to be entirely movable therewith free of wiring confusion and tangling, a plurality of lamp socket means all entirely integrally carried by said body portion and including at least one each alignable for illuminating the instrumentation as well as the accessories in a predetermined location on the dashboard means according to predetermined socket means positioning simultaneously determined only as all combined with each other to be integral with said body portion of insulating material, conducting terminal means provided in each of said lamp socket means for pre-mounting and electrical interconnection between energizable illuminators such as light bulbs lacking a metal base and termination from the wiring means directly on said body portion always together as accessible both after and prior to attachment thereof to the dashboard means of the vehicle, and fastening means projectable from said combined lamp socket means and body portion to maintain attachment of said body portion as a pre-wired plural-lamp unit fitted with lamp bulbs prior to installation directly on one side of the dashboard means.

6. The combination of claim 5 wherein said terminal means each have a U-shaped portion including a pair of bowed resilient legs engageable directly with a "wedge base" glass light bulb, specifically one terminal means in lamp socket means other than for generator as well as lubrication pressure indicator means having an integral tab portion extending laterally therefrom and bent over directly to engage conducting metal of the dashboard means as an electrical ground connection, the dashboard means having an apertured member of metal secured thereto and adapted to be engaged by a press fit of said fastening means which include a flange extension integrally of insulating material on at least a pair of spaced-apart lamp socket means all entirely integral with said body portion to complement the apertured metal member of said dashboard means.

7. For a vehicle having electrical wiring means such as insulated conductors, grouped wires as a harness and the like, as well as a dashboard means to carry instrumentation, accessories and the like each to be illuminated though access space thereto is limited and difficult to reach individually, an improvement which comprises a unitary illuminating-cluster subassembly per se separable as a pre-packaged unit that has predetermined dashboard mating fit for plural location illumination provided all from said unitary illuminating-cluster subassembly per se having an irregularly-shaped common main body portion of moldable insulating material readily handled as an entirely pre-wired and multi-light-bulb-fitted unit in spite of limited and difficult to reach access space on one side of the dashboard means though definitely separable therefrom only as the pre-wired multi-light-bulb unit, said common main body portion of moldable insulating material further including integrated plural lamp socket means all combined integrally with said irregularly-shaped common main body portion of moldable insulating material in predetermined fixed plural positions to complement dashboard plural illumination locations simultaneously as the pre-wired multi-light-bulb-unit is fitted thereto, terminal means fitted into assembly with each of said plural lamp socket means for predetermined mounting and interconnection between energizable illuminators such as light bulbs and termination from the wiring means directly all on said common main body portion in a location remote from and prior to attachment of said common main body portion to the dashboard means of the vehicle, and fastening means projectable from said combined plural lamp socket means and body portion to maintain attachment of said common main body portion including said plural lamp socket means joined thereby as a pre-wired multi-light-bulb unit separable for readily accessible light bulb servicing of any and all said lamp socket means in common therewith regardless of individual illumination locations otherwise difficult to reach and service individually from one side of the dashboard means and laterally thereof.

8. On a dashboard means of a vehicle having electrical wiring means as well as instrumentation grouped with accessories that can include fuel indicator means, temperature indication means, ignition switch means, generator-warning-indicator means, lubrication pressure-warning-indicator means, speedometer means and also accessories such as clocks, lighters, and the like each to be illuminated though access space thereto is limited and difficult to reach individually, the combination therewith of a unitary illuminating-cluster subassembly per se separable as a pre-packaged unit that has peredetermined mating fit for plural location illumination provided all from said unitary illuminating-cluster subassembly per se having a predetermined configuration to mate with the dashboard means as a readily handled pre-wired and multi-lamp-bulb-fitted unit in spite of limited and difficult to reach access space on one side of the dashboard means though definitely separable therefrom only as the pre-wired multi-lamp-bulb unit, said illuminating-cluster unitary body portion further including an integral channel-like guide portion recessed to complement as well as receive the wiring means for connection to conducting terminal means prefitted into plural lamp socket means having plural prepositioning collectively determined by said unitary illuminating-cluster body portion of insulating material which permits light bulb servicing of any and all said plural lamp socket means all in common therewith to be readily accessible regardless of individual illumination locations otherwise difficult to reach and service individually from one side of the dashboard means and laterally thereof.

References Cited by the Examiner

UNITED STATES PATENTS

| | | | |
|---|---|---|---|
| 1,835,456 | 12/31 | Bernard | 180—90 |
| 2,199,371 | 4/40 | Goldsmith | 317—99 |
| 2,299,140 | 10/42 | Hanson | 174—72 |
| 2,423,597 | 7/47 | Hurn | 180—90 |
| 2,614,156 | 10/52 | Nims | 317—99 |

| | | | |
|---|---|---|---|
| 2,953,769 | 9/60 | Woofter et al. | 339—191 |
| 3,009,010 | 11/61 | Stearns et al. | 174—72 |
| 3,015,718 | 1/62 | Petri | 240—8.16 |
| 3,017,599 | 1/62 | Loesch | 339—91 |
| 3,042,137 | 7/62 | Mathues et al. | 180—90 |
| 3,055,971 | 9/62 | Lander | 174—72 |

FOREIGN PATENTS

| | | |
|---|---|---|
| 1,181,243 | 6/59 | France. |

A. HARRY LEVY, *Primary Examiner.*

SAMUEL BERNSTEN, *Examiner.*